(12) United States Patent
Liu et al.

(10) Patent No.: US 8,843,070 B2
(45) Date of Patent: Sep. 23, 2014

(54) METHOD FOR TRANSMITTING AND RECEIVING INTERFERENCE CONTROL SIGNALING IN WIRELESS COMMUNICATION SYSTEM

(75) Inventors: Kun Liu, Shenzhen (CN); Zhaohua Lu, Shenzhen (CN); Ying Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 248 days.

(21) Appl. No.: 13/119,040

(22) PCT Filed: Sep. 15, 2009

(86) PCT No.: PCT/CN2009/073925
§ 371 (c)(1),
(2), (4) Date: Mar. 15, 2011

(87) PCT Pub. No.: WO2010/031321
PCT Pub. Date: Mar. 25, 2010

(65) Prior Publication Data
US 2011/0171911 A1    Jul. 14, 2011

(30) Foreign Application Priority Data

Sep. 16, 2008  (CN) .......................... 2008 1 0212056
Jan. 6, 2009   (CN) .......................... 2009 1 0002377

(51) Int. Cl.
| H04B 15/00 | (2006.01) |
| H04W 72/04 | (2009.01) |
| H04L 27/28 | (2006.01) |
| H04W 52/34 | (2009.01) |
| H04L 1/00  | (2006.01) |
| H04W 52/24 | (2009.01) |

(52) U.S. Cl.
CPC ........... *H04W 52/346* (2013.01); *H04L 1/0029* (2013.01); *H04W 52/243* (2013.01); *H04W 72/042* (2013.01)

USPC .......................................................... 455/63.1

(58) Field of Classification Search
USPC .............. 455/63.1, 69, 452.2, 452.1, 45, 403, 455/422.1, 550.1, 553.1, 556.2, 560–561, 455/509–514, 515, 101–105, 433–464, 455/67.11, 41.2, 507, 516–517, 522, 455/524–526, 556.1; 370/282, 203, 206, 370/208, 347–350, 319–321, 328–330, 337, 370/338, 341, 430–431; 375/260, 267, 275, 375/299, 347

See application file for complete search history.

(56) References Cited

U.S. PATENT DOCUMENTS

| 2005/0096061 A1* | 5/2005 | Ji et al. ........................ 455/450 |
| 2005/0197129 A1 | 9/2005 | Cho et al. |
| 2006/0268755 A1 | 11/2006 | Pajukoski et al. |
| 2007/0242769 A1 | 10/2007 | Yang |
| 2008/0039129 A1* | 2/2008 | Li et al. ........................ 455/522 |
| 2008/0214198 A1* | 9/2008 | Chen et al. ..................... 455/450 |
| 2009/0047971 A1* | 2/2009 | Fu ................................ 455/450 |
| 2010/0027502 A1* | 2/2010 | Chen et al. ..................... 370/330 |
| 2010/0061341 A1* | 3/2010 | Li et al. ........................ 370/331 |
| 2010/0208610 A1* | 8/2010 | Ihm et al. ...................... 370/252 |
| 2011/0003598 A1* | 1/2011 | Ma et al. ...................... 455/452.1 |
| 2011/0045831 A1* | 2/2011 | Chiu et al. ..................... 455/436 |
| 2011/0070911 A1* | 3/2011 | Zhang et al. ................... 455/509 |

FOREIGN PATENT DOCUMENTS

| CN | 1783861 A | 6/2006 |
| CN | 1926786 A | 3/2007 |
| CN | 101094213 A | 12/2007 |
| CN | 101189896 A | 5/2008 |
| WO | 2008/057971 A2 | 5/2008 |

OTHER PUBLICATIONS

International Search Report dated Dec. 24, 2009 issued in corresponding International Application No. PCT/CN2009/073925.

\* cited by examiner

*Primary Examiner* — Edward Urban
*Assistant Examiner* — Ralph H Justus

(74) *Attorney, Agent, or Firm* — Scully, Scott, Murphy & Presser, P.C.

(57) ABSTRACT

A method for transmitting and receiving interference control signaling in the wireless communication system is provided by the present invention, wherein the transmitting method includes: a base station firstly selecting SPI values of a part of sub-bands in a sub-band set in which the frequency reuse factor is Reuse=n>1 according to SPI value selecting regulation of sub-bands, then forming interference control signaling, and finally transmitting the interference control signaling to all the terminals under the base station through a downlink channel. The SPI values of a part of sub-bands may be either SPI values of $k_n-1$ sub-bands in a sub-band set in which the frequency reuse factor is Reuse=n>1, or SPI values of sub-bands corresponding to $L_n-1$ transmission power levels in a sub-band set in which frequency reuse factor is Reuse=n>1. Through the present invention, the system overhead can be effectively saved.

11 Claims, 7 Drawing Sheets

METHOD FOR TRANSMITTING AND RECEIVING INTERFERENCE CONTROL SIGNALING IN WIRELESS COMMUNICATION SYSTEM

FIELD OF THE INVENTION

The present invention relates to technical field of wireless communication, in particular to a method for transmitting and receiving interference control signaling in a wireless communication system.

BACKGROUND OF THE INVENTION

In the wireless communication system, a base station refers to equipment which provides service for terminals, and the base station communicates with the terminals through an up/down link. Downlink or forward direction refers to the direction from the base station to the terminal, while uplink or backward direction refers to the direction from the terminal to the base station. Multiple terminals can simultaneously transmit data to the base station through an up link, and simultaneously receive data from the base station through a down link.

In a data transmission system which uses base station scheduling control, the scheduling allocation of all the resources of the system are usually carried out by the base station, for example, the resource allocation when the base station performs downlink transmission and the resources which can be used when the terminal performs uplink transmission are both scheduled and allocated by the base station.

In the OFDM system, the down links, used during downlink data transmission between the base station and different terminals in a same cell, are orthogonal with each other, such that internal inter-cell interference can be avoided. However, the down links among different cells may be not orthogonal, so each terminal may be subjected to downlink interference from the base station of other adjacent cells, viz. inter-cell interference.

To reduce the effect of inter-cell interference on system performance is an important goal of the design of a cellular system, as the inter-cell interference will reduce the system capacity, especially the transmission capability of users at the edge of the cell, and thereby affect the covering capability of the system and the performance of the terminal. In order to overcome the inter-cell interference, a solution of Adaptive Frequency Reuse (referred to as AFR) can be used to allocate different sub-band resources to the terminals, so as to reduce the intensity of inter-cell interference. FIG. 1 is a schematic diagram of an allocation method of frequency resources of adjacent sectors and restriction on transmission power of each sub-band. As shown in FIG. 1, the main principle of the Adaptive Frequency Reuse solution is: firstly, all the available frequency resources are divided into 7 sub-band sets: $\vec{W}$: [$W_1$, $W_2$, $W_3$, $W_{12}$, $W_{23}$, $W_{13}$, $W_{123}$], wherein the frequency reuse factor of $W_1$, $W_2$, $W_3$ is 3 (viz. Reuse 3, also referred to as Reuse 1/3, hereinafter referred to as Reuse 3), viz. the frequency resources in $W_1$, $W_2$, $W_3$ are allocated to one of three adjacent sectors, and the other two sectors cannot use the frequency resources or need to employ a method of restricting the transmission power thereof in order to use the frequency resources, the reuse set of $W_1$, $W_2$, $W_3$ is called as Reuse=3; the frequency reuse factor of $W_{12}$, $W_{23}$, $W_{13}$ is 3/2, (viz. Reuse 3/2, also referred to as Reuse 2/3, hereinafter referred to as Reuse 3/2), viz. the frequency resources in $W_{12}$, $W_{23}$, $W_{13}$ are allocated to two of three adjacent sectors, and the third sector cannot use the frequency resources or need to employ a method of restricting the transmission power thereof in order to use the frequency resources, the reuse set of $W_{12}$, $W_{23}$, $W_{13}$ is called as Reuse=3/2; the frequency reuse factor of $W_{123}$ is 1 (viz. Reuse 1), viz. three adjacent sectors all can use the frequency resources limitlessly, the reuse set of $W_{123}$ is called as Reuse=1. Then, the base station allocates a cost (referred to as C) to each sub-band, viz. C=[$C_1$, $C_2$, $C_3$, $C_{12}$, $C_{23}$, $C_{13}$, $C_{123}$]. Each terminal obtains Spectral Efficiency (referred to as SE) of each sub-band through channel estimation, and feeds back Channel Quality Information (referred to as CQI) values of M (M≥1) sub-bands having the largest $nSE_i$ to the base station by comparing the sizes of $nSE_i=SE_i/Cost_i$ of each sub-band. Finally, the base station, according to CQI condition of sub-band reported by the terminal, performs resource allocation at the same time, self-adaptively adjusts the values of the cost of each sub-band, and notifies them to all the terminals in the cell.

In the above, the self-adaptive adjustment of cost value of each sub-band reflects the "cost" condition of different sub-bands in the cell, and the base station notifies the "cost" to all the terminals in the cell through the corresponding inter-cell interference control signaling. The terminals obtain the cost value of each sub-band by decoding the signaling, and further calculate $nSE_i$ to determine which sub-bands have the CQI values needed to be fed back to the base station. However, if the base station transmits the cost of all the sub-bands in the reuse set to the terminals, the system overhead will be increased.

SUMMARY OF THE INVENTION

The present invention is provided in view of the defect of increase in system overhead resulted from the cost of the transmission of the cost of all the sub-bands in the reuse set through the interference control signaling in the existing wireless communication system. Thus, the present invention aims to provide a method for transmitting and receiving interference control signaling in the wireless communication system in order to solve the above problem.

In order to achieve the above object, according to one aspect of the present invention, a method for transmitting interference control signaling in the wireless communication system is provided.

The method for transmitting interference control signaling in the wireless communication system according to the present invention comprises: a base station firstly selecting Sub-band Price Indication (SPI) values of a part of sub-bands in a sub-band set in which frequency reuse factor is Reuse=n>1 according to SPI value selecting regulation of sub-bands, then forming interference control signaling, and finally transmitting the interference control signaling to terminals of the base station through a downlink channel.

In the above method, the SPI values of a part of sub-bands refer to SPI values of $k_n-1$ sub-bands in a sub-band set in which the frequency reuse factor is Reuse=n>1, wherein $k_n$ is the number of the sub-bands in the sub-band set in which the frequency reuse factor is Reuse=n>1.

The SPI value selecting regulation of sub-bands refers to a selecting regulation for $k_n-1$ sub-bands. The base station can select the SPI values of $k_n-1$ sub-bands in the sub-band set in which the frequency reuse factor is Reuse=n>1 through the transmission power of the sub-bands or the serial numbers of the sub-bands according to configuration information, wherein, the configuration information includes transmission power of the sub-bands in a sub-band set in which the frequency reuse factor is Reuse=n≥1 and/or SPI values of sub-bands in a sub-band set in which Reuse n=1 and/or sum of SPI values of all the sub-bands in the sub-band set in which Reuse=n>1. If it is determined according to the transmission power of the sub-bands, either $k_n-1$ sub-bands having the highest transmission power or $k_n-1$ sub-bands having the lowest transmission power can be selected; if it is determined according to the serial numbers of the sub-bands, the stipulated $k_n-1$ sub-bands can be selected according to the SPI value selecting regulation of sub-bands, and the terminal and the base station obtain the stipulation through the SPI value selecting regulation of sub-bands.

The interference control signaling comprises Index and related SPI values; wherein the Index comprises Connect Identity (CID), and the relevant SPI values comprise SPI values of sub-bands that need to be transmitted in which the SPI values of sub-bands is described by way of absolute value or related value.

In the above method, the base station can transmit the interference control signaling to the terminal through different manners such as unicast, multicast or broadcast.

In order to achieve the above object, according to another aspect of the present invention, a method for receiving interference control signaling in the wireless communication system is provided.

The method for receiving interference control signaling in the wireless communication system according to the present invention comprises the following steps:

step 1, a terminal receiving interference control signaling transmitted by a base station;

step 2, the terminal obtaining SPI values of $k_n-1$ sub-bands in a sub-band set in which the frequency reuse factor is Reuse=n>1 through decoding the interference control signaling according to SPI value selecting regulation of sub-bands, wherein $k_n$ is the number of the sub-bands in the sub-band set in which frequency reuse factor is Reuse=n>1;

step 3, the terminal obtaining sum of SPI values of all the sub-bands in the sub-band set in which the frequency reuse factor is Reuse=n>1 according to the SPI value selecting regulation of sub-bands, and thereby, calculating to obtain SPI value of the $k_n$th sub-band in the sub-band set in which the frequency reuse factor is Reuse=n>1;

step 4, the terminal determining corresponding relation between each SPI value and the sub-band according to the SPI value selecting regulation of sub-bands; and step 5, the terminal obtaining SPI values of sub-bands in a sub-band set in which the frequency reuse factor is Reuse=1 according to the SPI value selecting regulation of sub-bands, and thereby, recovering SPI value of each sub-band in a sub-band set in which the frequency reuse factor is Reuse=n≥1.

As a preferred solution, when the frequency reuse factor is Reuse=n>1, SPI values corresponding to sub-bands with the same transmission power in a sub-band set of the same frequency reuse factors are the same, and sum of the SPI values of the sub-bands in which the frequency reuse factor is Reuse=n>1 satisfies the condition $$\sum_{i=1}^{L_n}\sum_{j=1}^{P_i} C_{nij} = a,$$

wherein n is the frequency reuse factor, $L_n$ is the number of transmission power levels in the sub-band set in which the frequency reuse factor is Reuse=n>1, $P_i$ is the number of sub-bands with a specific transmission power level, a is a known fixed value. Under this case, the base station only needs to transmit the SPI values of the sub-bands corresponding to $L_n-1$ transmission power levels in the sub-band set in which the frequency reuse factor is Reuse=n>1 to the terminal. Similarly, the selection of SPI values of $L_n-1$ sub-bands can be determined according to the transmission power of the sub-bands or the serial numbers of the sub-bands. If it is determined according to the transmission power of the sub-bands, the SPI values of the sub-bands corresponding to $L_n-1$ transmission power levels which having the highest transmission power can be selected, and the SPI values of the sub-bands corresponding to $L_n-1$ transmission power levels which having the lowest transmission power, or the SPI values of the sub-bands corresponding to specific $L_n-1$ transmission power levels also can be selected; if it is determined according to the serial numbers of the sub-bands, the SPI values of stipulated $L_n-1$ sub-bands can be selected according to the SPI value selecting regulation of sub-bands, and the terminal and the base station obtain the stipulated $L_n-1$ sub-bands through the SPI value selecting regulation of sub-bands.

In order to achieve the above object, according to another aspect of the present invention, a method for receiving interference control signaling in the wireless communication system is provided.

The method for receiving interference control signaling in the wireless communication system according to the present invention comprises the following steps:

step 1, a terminal receiving interference control signaling transmitted by a base station;

step 2, the terminal obtaining SPI values corresponding to sub-bands of $L_n-1$ transmission power levels in a sub-band set in which frequency reuse factor is Reuse=n>1 through decoding the interference control signaling according to the SPI value selecting regulation of sub-bands, wherein $L_n$ is the number of transmission power levels in the sub-band set in which the frequency reuse factor is Reuse=n>1;

step 3, the terminal obtaining sum of the SPI values of all the sub-bands in the sub-band set in which the frequency reuse factor is Reuse=n>1 according to the SPI value selecting regulation of sub-bands, and thereby, calculating to obtain SPI value corresponding to sub-band of the $L_n$th power level in the sub-band set in which the frequency reuse factor is Reuse=n>1;

step 4, the terminal determining the corresponding relation between each SPI value and the sub-band according to the SPI value selecting regulation of sub-bands; and step 5, the terminal obtaining SPI values of sub-bands in a sub-band set in which the frequency reuse factor is Reuse=1 according to the SPI value selecting regulation of sub-bands, and thereby, recovering SPI value of each sub-band in the sub-band set in which the frequency reuse factor is Reuse=n≥1.

In order to achieve the above object, according to another aspect of the present invention, a method for transmitting interference control signaling in the wireless communication system is provided.

The method for transmitting interference control signaling in the wireless communication system according to the present invention comprises: a base station transmitting information of SPI (Sub-band Price Indication, also referred to as resource metric) values of a part of sub-bands to a terminal through a downlink channel.

In the above, the part of sub-bands is the part of sub-bands in a sub-band set (frequency partition) in which the frequency reuse factor is Reuse n (n≠1) and/or sub-bands in a sub-band set in which the frequency reuse factor is Reuse n (n=1).

The SPI values of the part of sub-bands are at least one of the following:

(1) SPI values of $k_n-1$ sub-bands in a sub-band set in which the frequency reuse factor is Reuse n (n≠1), wherein $k_n$ is the number of sub-bands in the sub-band set in which the frequency reuse factor is Reuse n (n≠1);

(2) SPI values corresponding to sub-bands of $L_n-1$ transmission power levels in the sub-band set in which the frequency reuse factor is Reuse n (n≠1), wherein $L_n$ is the number of transmission power levels in the sub-band set in which the frequency reuse factor is Reuse n (n≠1); and (3) SPI values of sub-bands in a sub-band set in which the frequency reuse factor is Reuse n (n=1).

If the SPI values of the part of sub-bands are SPI values of $k_n-1$ sub-bands in the sub-band set in which the frequency reuse factor is Reuse n (n≠1), the information of the SPI values of the part of sub-bands is determined by at least one of the following manners:

(1) by the base station according to the SPI value selecting regulation of sub-bands, wherein the SPI value selecting regulation of sub-bands is configured to select SPI values of $k_n-1$ sub-bands in the sub-band set in which the base station frequency reuse factor is Reuse n (n≠1) according to transmission power of the sub-bands and/or serial numbers of the sub-bands and/or other information related to the sub-bands, and the SPI value selecting regulation of sub-bands is performed in at least one of the following methods: selecting SPI values of $k_n-1$ sub-bands having the highest transmission power, selecting SPI values of $k_n-1$ sub-bands having the lowest transmission power, and selecting SPI values of pre-determined $k_n-1$ sub-bands;

(2) by an upper-layer network element according to the SPI value selecting regulation of sub-bands, wherein the SPI value selecting regulation of sub-bands is configured to select SPI values of $k_n-1$ sub-bands in the sub-band set in which the base station frequency reuse factor is Reuse n (n≠1) according to the transmission power of the sub-bands and/or the serial numbers of the sub-bands and/or other information related to the sub-bands, and the SPI value selecting regulation of sub-bands is performed in at least one of the following manners: selecting SPI values of $k_n-1$ sub-bands having the highest transmission power, selecting SPI values of $k_n-1$ sub-bands having the lowest transmission power, and selecting SPI values of pre-determined $k_n-1$ sub-bands; and (3) by the base station according to the SPI values selecting regulation of sub-bands which is determined by the upper-layer network element, wherein the SPI value selecting regulation of sub-bands is configured to select SPI values of $k_n-1$ sub-bands in the sub-band set in which the base station frequency reuse factor is Reuse n (n≠1) according to the transmission power of the sub-bands and/or the serial numbers of the sub-bands and/or other information related to the sub-bands, and the SPI value selecting regulation of sub-bands is performed in at least one of the following methods: selecting SPI values of $k_n-1$ sub-bands having the highest transmission power, selecting SPI values of $k_n-1$ sub-bands having the lowest transmission power, and selecting SPI values of pre-determined $k_n-1$ sub-bands.

If the SPI values of the part of sub-bands are the SPI values corresponding to sub-bands of $L_n-1$ transmission power levels in the sub-band set in which the frequency reuse factor is Reuse n (n≠1), and the information of the SPI values of the part of sub-bands is determined by at least one of the following manners:

(1) by the base station according to SPI value selecting regulation of sub-bands, wherein the SPI value selecting regulation of sub-bands is configured to select SPI values corresponding to sub-bands of $L_n-1$ transmission power levels in the sub-band set in which the base station frequency reuse factor is Reuse n (n≠1) according to the transmission power of the sub-bands; and the SPI value selecting regulation of sub-bands is performed in at least one of the following manners: selecting SPI values of $L_n-1$ sub-bands having the highest transmission power level, selecting SPI values of $L_n-1$ sub-bands having the lowest transmission power, and selecting SPI values corresponding to pre-determined sub-bands of $L_n-1$ transmission power levels;

(2) by an upper-layer network element according to the SPI value selecting regulation of sub-bands, wherein the SPI value selecting regulation of sub-bands is configured to select SPI values corresponding to sub-bands of $L_n-1$ transmission power levels in the sub-band set in which the base station frequency reuse factor is Reuse n (n≠1) according to the transmission power of the sub-bands; and the SPI value selecting regulation of sub-bands is performed in at least one of the following manners: selecting SPI values of $L_n-1$ sub-bands having the highest transmission power level, selecting SPI values of $L_n-1$ sub-bands having the lowest transmission power, and selecting SPI values corresponding to pre-determined sub-bands of $L_n-1$ transmission power levels; and (3) by the base station according to the SPI value selecting regulation of sub-bands which is determined by the upper-layer network element, wherein the SPI value selecting regulation of sub-bands is configured to select SPI values corresponding to sub-bands of $L_n-1$ transmission power levels in the sub-band set in which the base station frequency reuse factor is Reuse n (n≠1) according to the transmission power of the sub-bands; and the SPI value selecting regulation of sub-bands is performed in at least one of the following manners: selecting SPI values of $L_n-1$ sub-bands having the highest transmission power level, selecting SPI values of $L_n-1$ sub-bands having the lowest transmission power, and selecting SPI values corresponding to pre-determined sub-bands of $L_n-1$ transmission power levels.

In the above method, the base station transmits the information of the SPI values of the part of sub-bands to the terminal by at least one of the following manners: unicast, multicast, and broadcast.

In order to achieve the above object, according to another aspect of the present invention, a method for receiving interference control signaling in the wireless communication system is provided.

The method for receiving interference control signaling in the wireless communication system according to the present invention comprises: a terminal receiving interference control signaling, and determining SPI values of sub-bands.

In the above, the method for determining SPI values of sub-bands comprises: recovering an algorithm of SPI values of the remaining sub-bands from the information of the SPI values of the part of sub-bands which have been obtained by decoding.

The above recovering an algorithm of SPI values of the remaining sub-bands from the information of the SPI values of the part of sub-bands which have been obtained by decoding comprises:

the terminal recovering the algorithm of SPI values of the other sub-bands according to the known sum of the SPI values of the sub-bands in the sub-band set in which the frequency reuse factor is Reuse n (n≠1) and the SPI values of $k_n-1$ sub-bands in the sub-band set in which the frequency reuse factor is Reuse n (n≠1) obtained by decoding the interference control signaling; or the terminal recovering SPI values of the other sub-bands according to the known sum of the SPI values of the sub-bands in the sub-band set in which the frequency reuse factor is Reuse n (n≠1) and the SPI values of sub-bands of $L_n-1$ power levels in the sub-band set in which the frequency reuse factor is Reuse n (n≠1) obtained by decoding the interference control signaling, and further obtaining the algorithm of SPI value of each sub-band in the sub-band set in which the frequency reuse factor is Reuse n (n≠1), wherein the SPI values of sub-bands having the same transmission power level in the sub-band set in which the frequency reuse factor is Reuse n (n≠1) are same; or the terminal obtains SPI values of sub-bands in a sub-band set in which the frequency reuse factor is Reuse n (n=1) by decoding the interference control signaling.

The terminal obtains the sum of SPI values of sub-bands in the sub-band set in which the frequency reuse factor is Reuse n (n≠1) by at least one of the following manners:

storing the sum of SPI values of sub-bands in the sub-band set in which the frequency reuse factor is Reuse n (n≠1) as default configuration at the terminal;

transmitting, by the base station, the sum of SPI values of sub-bands in the sub-band set in which the frequency reuse factor is Reuse n (n≠1) to the terminal through relevant signaling; and transmitting, by the upper-lay network element, the sum of SPI values of sub-bands in the sub-band set in which the frequency reuse factor is Reuse n (n≠1) to the base station, and then transmitting, by the base station, the same to the terminal through relevant signaling.

By means of at least one of the above technical solutions, the base station only needs to transmit SPI values of a part of sub-bands, instead of SPI values of all the sub-bands, in a reuse set to the terminal. Compared with the prior art, the present invention can effectively save the system overhead, and facilitates the terminal's analyzing SPI value of each sub-band.

BRIEF DESCRIPTION OF THE ACCOMPANYING DRAWINGS

The drawings herein are used to provide further understanding of the present invention and form a part of the specification. The exemplary embodiments of the present invention and the description thereof are used to explain the present invention rather than unduly limit the present invention. In the accompanying drawings.

Figure 9:
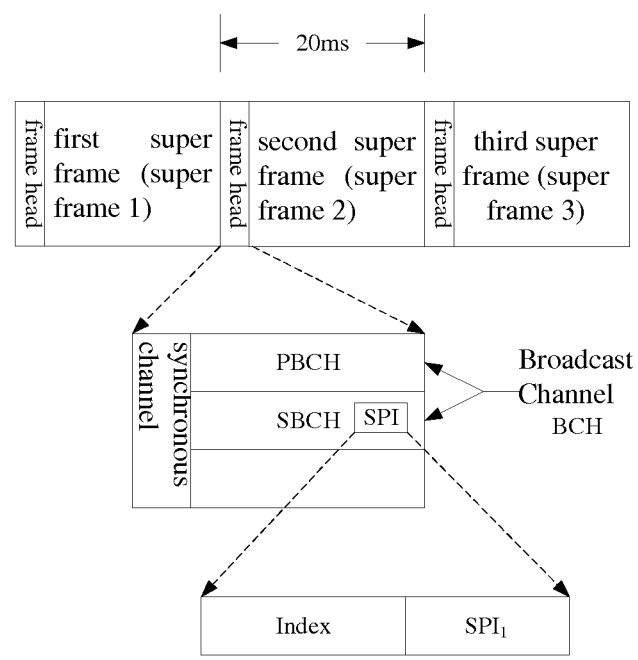
Figure 10:
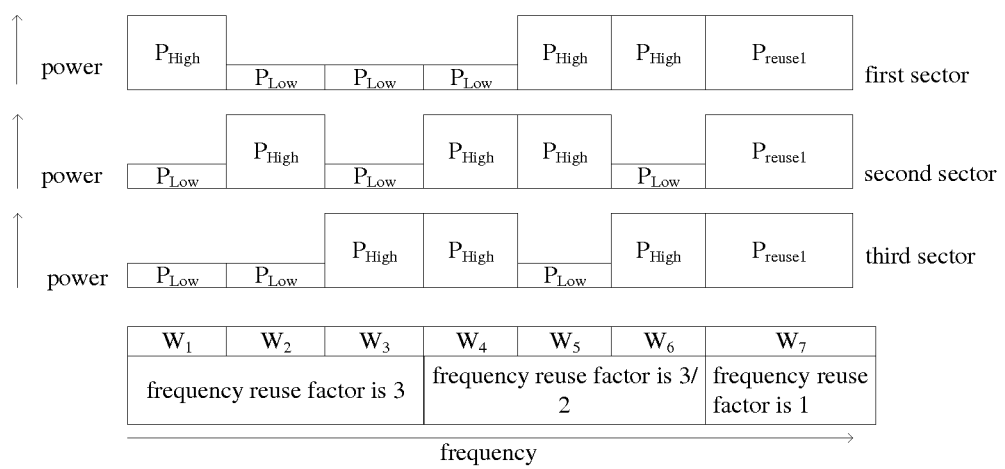

FIG. 9 is a schematic diagram of the mode in which interference control signaling is transmitted in 20 ms frame structure in Embodiment 2 of the present invention; and FIG. 10 is a schematic diagram of an allocation method of frequency resources of adjacent sectors and restriction on transmission power of each sub-band in Embodiment 5, Embodiment 6, Embodiment 7, Embodiment 11, Embodiment 12, and Embodiment 13 of the present invention.

DETAILED DESCRIPTION OF THE PREFERRED EMBODIMENTS

Brief Description on Functions

In the technical solution provided by the present embodiment, a base station firstly selects SPI values of a part of sub-bands in a sub-band set in which frequency reuse factor is Reuse=n>1 according to the SPI value selecting regulation of sub-bands, then forms interference control signaling, and finally transmits the interference control signaling to all the terminals under the base station through a downlink channel. The SPI values of the part of sub-bands can be either SPI values of $k_n-1$ sub-bands in the sub-band set in which the frequency reuse factor is Reuse=n>1, or SPI values of sub-bands corresponding to $L_n-1$ transmission power levels in the sub-band set in which the frequency reuse factor is Reuse=n>1. Compared with the prior art, the technical solution provided by the present embodiment can effectively save the system overhead.

In order to further describe the technical means and effect used in the present embodiment for achieving the pre-determined object, a method for transmitting and receiving interference control signaling in the wireless communication system proposed by the present embodiment is now described in detail in conjunction with the drawings and embodiments. It should be understood that the embodiments of the present invention and the features of the embodiments can be combined with each other if there is no conflict.

In the wireless communication system in which AFR technology is applied, a terminal can obtain SPI value selecting regulation of sub-bands in the following three manners:

(1) being stored as default configuration in a base station and a terminal;

(2) being transmitted, by the base station, to the terminal of the base station at one time, wherein the transmission mode can be unicast, multicast, broadcast or the like, and the being transmitted at one time here means that the SPI value selecting regulation of sub-bands only needs to be transmitted for one time at the beginning, and then does not need to be carried in interference control signaling for repeated transmission, until the regulation changes.

(3) being periodically transmitted, by the base station, to the terminal of the base station, wherein the transmission mode can be unicast, multicast, broadcast or the like.

For the above manners (1) and (2), configuration information based on which the base station selects the SPI values of sub-bands comprises at least one of the followings: transmission power of sub-bands in a sub-band set in which the frequency reuse factor is Reuse=n≥1; SPI values of sub-bands in a sub-band set of Reuse n=1; and the sum of SPI values of all the sub-bands in a sub-band set of Reuse=n>1.

The information of transmission power of the sub-bands in the sub-band set in which the frequency reuse factor is Reuse=n≥1 can include at least one of the followings: dividing manner of AFR frequency resource; allocating manner of sub-band transmission power; serial numbers of sub-bands; and the corresponding relation between the sub-band transmission power and the frequency reuse factor Reuse=n≥1.

Embodiment 1

Figures 4, 5:
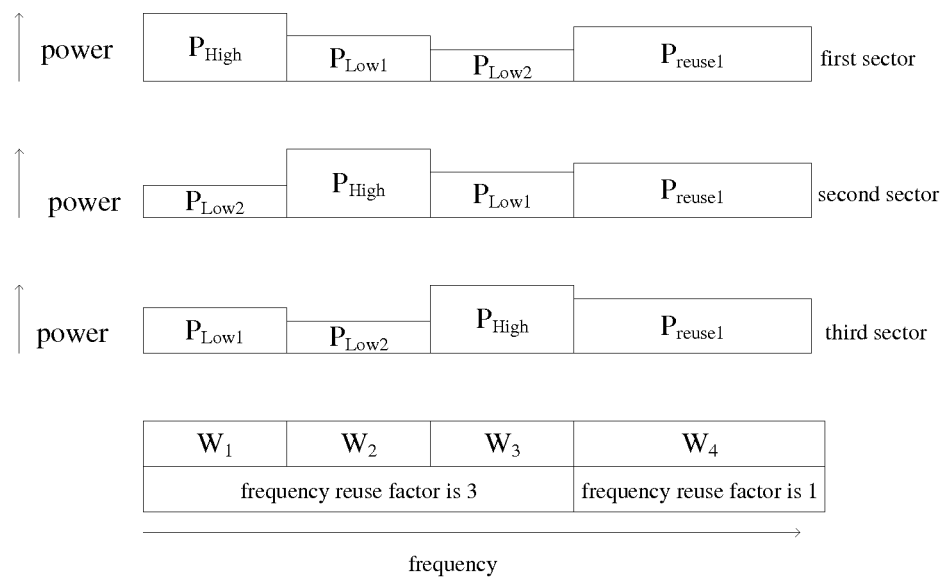
FIG. 4 is a schematic diagram of an allocation method of frequency resources of adjacent sectors and restriction on transmission power of each sub-band in Embodiment 1, Embodiment 3, and Embodiment 9 of the present invention.
FIG. 5 is a structural schematic diagram of interference control signaling in Embodiment 1 of the present invention.

FIG. 4 is a schematic diagram of an allocation method of frequency resources of adjacent sectors and restriction on transmission power of each sub-band in Embodiment 1 of the present invention. As shown in FIG. 4, the frequency resources are divided into two frequency reuse sets, viz. a first reuse set Reuse1 and a second reuse set Reuse3, wherein [$W_1$, $W_2$, $W_3$] belongs to the second reuse set Reuse3, $W_4$ belongs to the first reuse set Reuse1. The transmission power of [$W_1$, $W_2$, $W_3$, $W_4$] in the first sector is [$P_{High}$, $P_{Low1}$, $P_{Low2}$, $P_{reuse1}$] the transmission power of [$W_1$, $W_2$, $W_3$, $W_4$] in the second sector is [$P_{Low1}$, $P_{Low2}$, $P_{High}$, $P_{reuse1}$] the transmission power of [$W_1$, $W_2$, $W_3$, $W_4$] in the third sector is [$P_{Low1}$, $P_{Low2}$, $P_{High}$, $P_{reuse1}$] and the condition $P_{High} > P_{reuse1} > P_{Low1} > P_{Low2}$ is satisfied. A base station transmits configuration information such as the dividing manner of AFR frequency resource, the allocating manner of sub-band transmission power, the serial numbers of sub-bands, the corresponding relation between the sub-band transmission power and the frequency reuse factor Reuse=n≥1, SPI values of sub-bands in the sub-band set in which the frequency reuse factor is Reuse=1, the sum a of SPI values of all the sub-bands in the sub-band set in which the frequency reuse factor is Reuse=n>1 to all the terminals of the base station through a Broadcast Channel (referred to as BCH). Taking the first sector as an example, a method for transmitting interference control signaling and the corresponding method for receiving the same are described as follows.

The process of transmitting interference control signaling in the present embodiment comprises: a base station side, as the SPI value of sub-band of the first reuse set Reuse1 is a fixed value, supposing that the value is 1, the $SPI_4$ corresponding to the sub-band $W_4$ is $SPI_4=1$, if the SPI values [$SPI_1$, $SPI_2$, $SPI_3$] corresponding to the sub-bands [$W_1$, $W_2$, $W_3$] of the second reuse set Reuse3 at a certain moment are [1.8, 0.7, 0.5], the SPI values of the sub-bands in the set satisfy $$\sum_{j=1}^{3} SPI_{nj} = SPI_1 + SPI_2 + SPI_3 = 3 = a.$$

Figure 6:
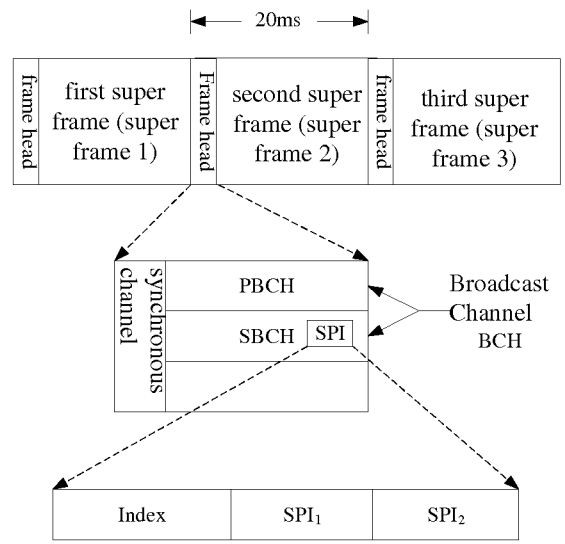
FIG. 6 is a schematic diagram of the mode in which interference control signaling is transmitted in 20 ms frame structure in Embodiment 1 of the present invention.

Firstly, the base station can determine SPI values of a part of sub-bands to be transmitted according to the sub-band power allocation relation of the second reuse set Reuse 3, specifically, according to the selected two sub-bands having the highest transmission power, or the selected two sub-bands having the lowest transmission power, or two sub-bands having particular transmission power. In the present embodiment, the SPI values of the part of sub-bands to be transmitted are determined according to the SPI values [$SPI_1$, $SPI_2$] (i.e. [1.8, 0.7]) of the selected two sub-bands having the highest transmission power. FIG. 5 shows that the base station forms the selected SPI value to be transmitted into a format of interference control signaling, wherein Index is the index of the SPI value in the interference control signaling and at least includes Connect Identity, and if the SPI value to be transmitted is transmitted by broadcast, the Connect Identity is broadcast connection identity. The SPI values [$SPI_1$, $SPI_2$] can be described through absolute value or differential value: the description mode by absolute value indicates describing the actual numerical value of SPI value of each sub-band; and the description mode by differential value indicates selecting SPI value of a certain sub-band as a criterion and describing the SPI value of the sub-band by absolute value, while describing SPI values of the other sub-bands using differential value which is relative to the absolute value. The base station transmits the interference control signaling to all the terminals of the base station through BCH. FIG. 6 describes the mode in which interference control signaling is transmitted in 20 ms frame structure. As shown in FIG. 6, the base station can transmit the interference control signaling through Second Broadcast Channel (referred to as SBCH) in the BCH channel, the interference control signaling containing an Index and SPI value of sub-band transmitted.

Figure 1:
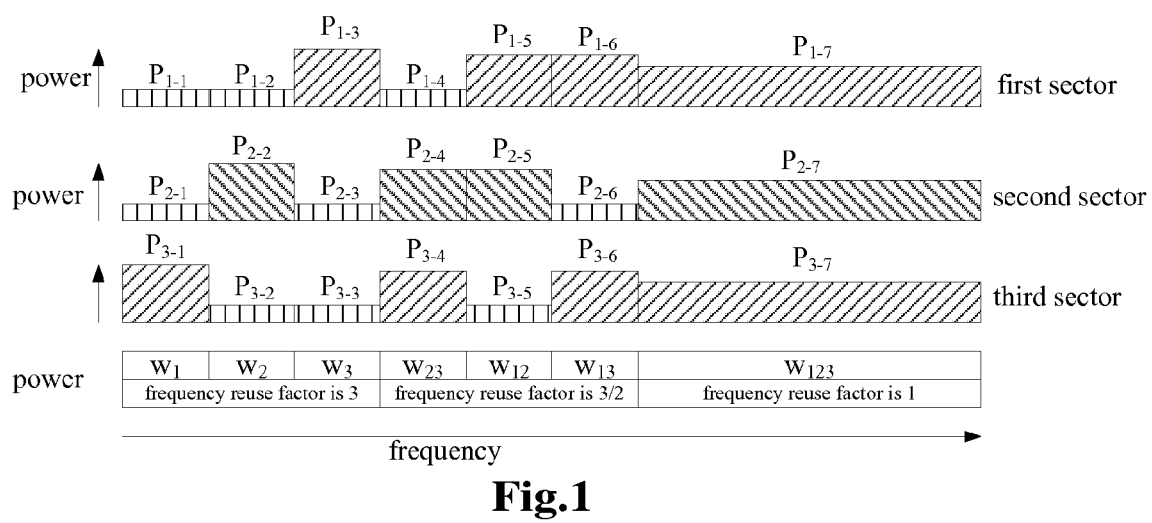
FIG. 1 is a schematic diagram of an allocation method of frequency resources of adjacent sectors and restriction on transmission power of each sub-band.
Figure 2:
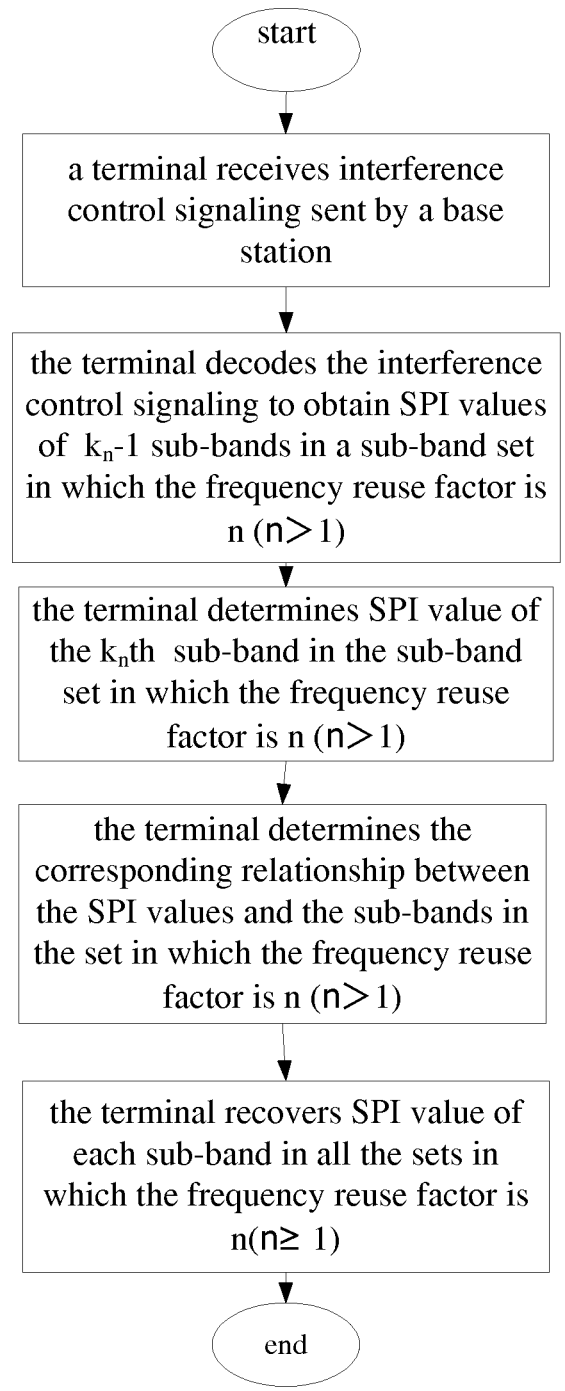
FIG. 2 is a flow chart of a method for receiving interference control signaling in the wireless communication system of an embodiment of the present invention.

FIG. 2 is a flow chart of a method for receiving interference control signaling in the wireless communication system of an embodiment of the present invention, which is used for receiving the above mentioned interference control signaling. As shown in FIG. 2, the receiving method comprises: a terminal decoding received interference control signaling sent by a base station, obtaining SPI values of Kn−1 sub-bands in a sub-band set of Reuse n (n>1), determining SPI value of the Knth sub-band in the sub-band set of Reuse n (n>1) and the corresponding relation between the SPI values and the sub-bands in the set of Reuse n (n>1), then the terminal recovering SPI value of each sub-band in all the sets of Reuse n (n≥1).

Specifically, the process of receiving the interference control signaling in the embodiment comprises: terminal side, the terminal in the first sector has known [$W_1$, $W_2$, $W_3$, $W_4$] and the corresponding transmission power allocation mode [$P_{High}$, $P_{Low1}$, $P_{Low2}$, $P_{reuse1}$] according to the SPI value selecting regulation of sub-bands. After receiving the interference control signaling transmitted by the base station, the terminal decodes the interference control signaling and recovers [$SPI_1$, $SPI_2$], i.e. [1.8, 0.7], and according to the restriction condition $SPI_1+SPI_2+SPI_3=3$, obtains [$SPI_3=0.5$] by introducing [$SPI_1=1.8$, $SPI_2=0.7$]; then, according to the corresponding relation between the SPI values and the sub-band transmission power in transmission, viz. the two sub-bands having the highest power, the terminal determines [$SPI_1$, $SPI_2$] as the SPI values corresponding to [$W_1$, $W_2$] sub-bands, and [$SPI_3$] as the SPI value corresponding to sub-band [$W_3$]; and finally, the terminal recovers the SPI values [$SPI_1$, $SPI_2$, $SPI_3$, $SPI_4$], i.e. [1.8, 0.7, 0.5, 1], corresponding to each sub-band [$W_1$, $W_2$, $W_3$, $W_4$] in all the reuse sets, according to $SPI_4=1$ of sub-band $W_4$ in the first reuse set Reuse1, which is pre-determined by the base station and the terminal.

Embodiment 2

Figure 7:
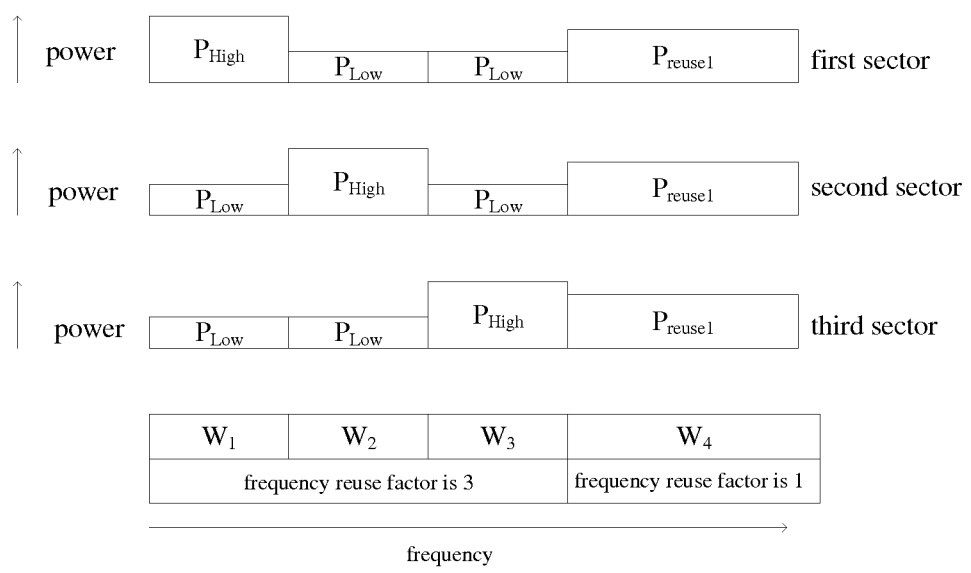
FIG. 7 is a schematic diagram of an allocation method of frequency resources of adjacent sectors and restriction on transmission power of each sub-band in Embodiment 2, Embodiment 4, Embodiment 8, Embodiment 10, and Embodiment 14 of the present invention.

FIG. 7 is a schematic diagram of an allocation method of frequency resources of adjacent sectors and restriction on transmission power of each sub-band in Embodiment 2 of the present invention. As shown in FIG. 7, firstly, the frequency resources are divided into two frequency reuse sets, viz. a first reuse set Reuse1 and a second reuse set Reuse3, wherein [$W_1$, $W_2$, $W_3$] belongs to the second reuse set Reuse3, $W_4$ belongs to the first reuse set Reuse1. The transmission power of [$W_1$, $W_2$, $W_3$, $W_4$] in the first sector is [$P_{High}$, $P_{Low}$, $P_{Low}$, $P_{reuse1}$] the transmission power of [$W_1$, $W_2$, $W_3$, $W_4$] in the second sector is [$P_{Low}$, $P_{High}$, $P_{Low}$, $P_{reuse1}$], the transmission power of [$W_1$, $W_2$, $W_3$, $W_4$] in the third sector is [$P_{Low}$, $P_{Low}$, $P_{High}$, $P_{reuse1}$], and the condition $P_{High} > P_{reuse1} > P_{Low}$ is satisfied. A base station transmits configuration information such as the dividing manner of AFR frequency resource, the allocating manner of sub-band transmission power, the serial numbers of sub-bands, the corresponding relation between the sub-band transmission power and the frequency reuse factor Reuse=n≥1, SPI values of sub-bands in the sub-band set in which the frequency reuse factor is Reuse=1, the sum a of SPI values of all the sub-bands in the sub-band set in which the frequency reuse factor is Reuse=n>1 to all the terminals of the base station through BCH. Taking the first sector as an example, a method for transmitting interference control signaling and the corresponding method for receiving the same are described as follows.

The process of transmitting interference control signaling in the present embodiment comprises: a base station side, as the SPI value of sub-band of the first reuse set Reuse1 is a fixed value, supposing that the value is 1, the $SPI_4$ corresponding to the sub-band $W_4$ is $SPI_4=1$. If the SPI values $[SPI_1, SPI_2, SPI_3]$ corresponding to the sub-bands $[W_1, W_2, W_3]$ of the second reuse set Reuse3 at a certain moment are [1.8, 0.6, 0.6], the SPI values of the sub-bands in the set satisfy $$\sum_{i=1}^{2}\sum_{j=1}^{P_i} C_{nij} = SPI_1 + SPI_2 + SPI_3 = 3 = a.$$

Figure 8:
FIG. 8 is a structural schematic diagram of interference control signaling in Embodiment 2 of the present invention.

According to that the SPI values of sub-bands of the same transmission power level in the sub-band sets which have the same frequency reuse factor Reuse=n>1 are the same, and that the SPI values in the sub-band sets which have the same frequency reuse factor Reuse=n>1 satisfy the condition $\Sigma SPI_i=a$, considering that the second reuse set Reuse3 in the present embodiment only has two power levels, wherein sub-band $W_1$ corresponds to $P_{High}$, and sub-bands $[W_2, W_3]$ correspond to $P_{Low}$, the base station only needs to transmit the SPI value corresponding to the sub-band of one transmission power level in the second reuse set Reuse3. Firstly, the base station can determine SPI values of a part of sub-bands to be transmitted according to the SPI values of sub-bands corresponding to the highest transmission power level, or the SPI values of sub-bands corresponding to the lowest transmission power level. In the present embodiment, the SPI values of the part of sub-bands to be transmitted are determined according to the SPI value $[SPI_1]$ (i.e. [1.8]) of sub-band corresponding to the highest transmission power level. FIG. 8 is a structural schematic diagram of interference control signaling in Embodiment 2 of the present invention. As shown in FIG. 8, wherein Index is the index of the SPI value in the interference control signaling and at least includes Connect Identity, and if the manner of the transmission is broadcast, the Connect Identity is broadcast connection identity. The SPI values $[SPI_1]$ can be described through absolute value or differential value: the description mode by absolute value indicates describing the actual numerical value of SPI value of each sub-band; and the description mode by differential value indicates selecting SPI value of a certain sub-band as a criterion and describing the SPI value of the sub-band by absolute value, while describing SPI values of the other sub-bands using differential value which is relative to the absolute value. Finally, the base station transmits the interference control signaling to all the terminals of the base station through BCH. FIG. 9 describes the mode in which interference control signaling is transmitted in 20 ms frame structure, wherein the base station can transmit the interference control signaling through SBCH channel in the BCH channel, and the interference control signaling containing an Index and SPI value of sub-band transmitted.

Figure 3:
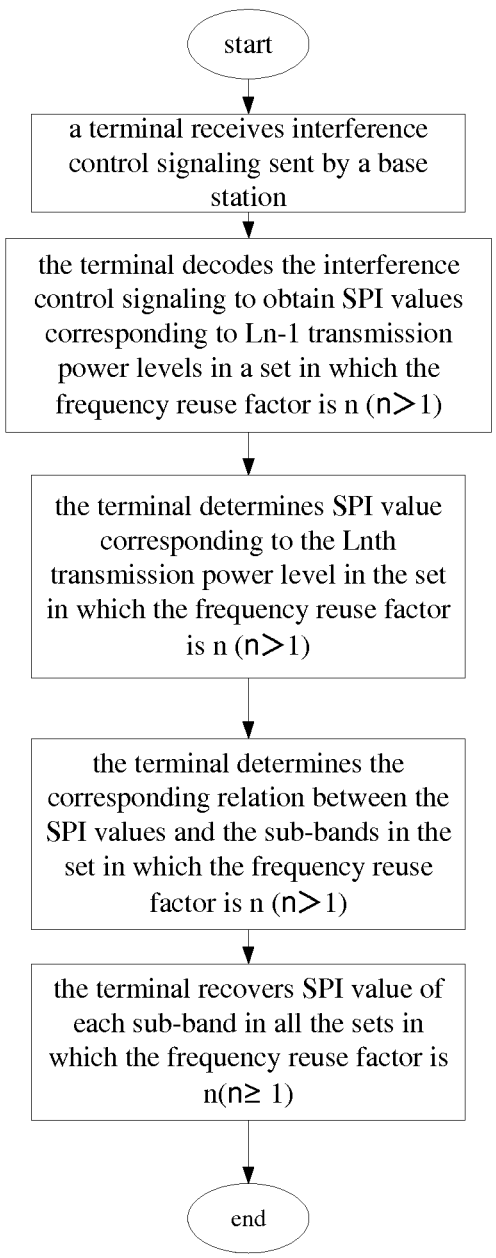
FIG. 3 is a flow chart of another method for receiving interference control signaling in the wireless communication system of an embodiment of the present invention.

FIG. 3 is a flow chart of a method for receiving interference control signaling in the wireless communication system of the present embodiment, and the method is used for receiving the above mentioned interference control signaling in the present embodiment. As shown in FIG. 3, the receiving method comprises: a terminal decoding received interference control signaling sent by a base station, obtaining SPI values corresponding to Ln−1 transmission power levels in the set of Reuse n (n>1), and determining the SPI value corresponding to the Lnth transmission power level in the set of Reuse n (n>1) and the corresponding relationship between the SPI values and the sub-bands in the set of Reuse n (n>1), then the terminal recovering SPI value of each sub-band in all the sets of Reuse n (n≥1).

Specifically, the process of receiving the interference control signaling in the embodiment comprises: terminal side, the terminal in the first sector has known $[W_1, W_2, W_3, W_4]$ and the corresponding transmission power allocation manner $[P_{High}, P_{Low}, P_{Low}, P_{reuse1}]$ according to the SPI value selecting regulation of sub-bands. After receiving the interference control signaling transmitted by the base station, the terminal decodes the interference control signaling and recovers $[SPI_1]$, i.e. [1.8], and according to the restriction conditions $SPI_1+SPI_2+SPI_3=3$ and $SPI_2=SPI_3$, obtains $[SPI_2=SPI_3=0.6]$ by introducing $[SPI_1=1.8]$; then according to the corresponding relationship between the SPI values and power level of the sub-band transmission in transmission, viz. the highest power level of sub-bands, the terminal determines $[SPI_1]$ as SPI value of sub-band $[W_1]$, and $[SPI_2, SPI_3]$ as SPI values corresponding to sub-bands $[W_2, W_3]$; and finally, the terminal recovers the SPI values $[SPI_1, SPI_2, SPI_3, SPI_4]$, i.e. [1.8, 0.6, 0.6, 1], corresponding to each sub-band $[W_1, W_2, W_3, W_4]$ in all the reuse sets, according to $SPI_4=1$ of sub-band $W_4$ in the first reuse set Reuse1, which is pre-determined by the base station and the terminal.

Embodiment 3

The present embodiment is described in detail with FIG. 4 as an example. As shown in FIG. 4, the frequency resources are divided into two frequency sets, viz. Frequency Partition#1 (Reuse 3) and Frequency Partition#2 (Reuse 1), wherein, $[W_1, W_2, W_3]$ belongs to Frequency Partition#1, $W_4$ belongs to Frequency Partition#2. The transmission power of $[W_1, W_2, W_3, W_4]$ in Sector 1 is $[P_{High}, P_{Low1}, P_{Low2}, P_{reuse1}]$ the transmission power of $[W_1, W_2, W_3, W_4]$ in Sector 2 is $[P_{Low2}, P_{High}, P_{Low1}, P_{reuse1}]$ the transmission power of $[W_1, W_2, W_3, W_4]$ in Sector 3 is $[P_{Low1}, P_{Low2}, P_{High}, P_{reuse1}]$ and the condition $P_{High}>P_{reuse1}>P_{Low1}>P_{Low2}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of $k_n-1$ sub-bands which have the lowest transmission power in the sub-band set in which the frequency reuse factor is Reuse n (n≠1), wherein $k_n$ is the number of the sub-bands in the sub-band set in which the frequency reuse factor is Reuse n (n≠1).

The sum a (a=3 in the present embodiment) of the SPI values of the sub-bands in Frequency Partition#1 and the SPI value b (b=1 in the present embodiment) of the sub-band in Frequency Partition#2 are determined and notified to the base station by the upper-layer network element, and then, are transmitted to the terminal by the base station through the corresponding signaling.

Taking Sector 1 as an example, the method for transmitting the interference control signaling and the corresponding receiving method are described in detail.

(1) The base station selects SPI values of two sub-bands, viz. [$W_2$, $W_3$], having the lowest transmission power in Frequency Partition#1 according to the SPI value selecting regulation of sub-bands. In the present embodiment, supposing that the SPI values [$SPI_1$, $SPI_2$, $SPI_3$] of the sub-bands [$W_1$, $W_2$, $W_3$] in Frequency Partition#1 are [1.8, 0.7, 0.5] at current moment, the base station selects [$SPI_2$, $SPI_3$], viz. [0.7, 0.5], and transmits [0.7, 0.5] through the interference control signaling by means of broadcast for being received by the terminal.

(2) The terminal receives the interference control signaling transmitted by the base station, recovers the SPI values [$SPI_2$, $SPI_3$], viz. [0.7, 0.5], of [$W_2$, $W_3$] by decoding, and calculates to obtain the SPI value $SPI_1$ of [$W_1$] according to the sum a (a=3) of SPI values of each sub-band in Frequency Partition#1 which is obtained beforehand, viz. $SPI_1$=a−$SPI_2$−$SPI_3$=3−0.7−0.5=1.8.

(3) The terminal obtains that $SPI_4$ of the sub-band [$W_4$] is $SPI_4$=1 according to the SPI value b=1 of the sub-band in Frequency Partition#2 which is obtained beforehand.

Embodiment 4

The present embodiment is described in detail with FIG. 7 as an example. As shown in FIG. 7, firstly, the frequency resources are divided into two frequency sets, viz. Frequency Partition#1 (Reuse 3) and Frequency Partition#2 (Reuse 1), wherein [$W_1$, $W_2$, $W_3$] belongs to Frequency Partition#1, $W_4$ belongs to Frequency Partition#2. The transmission power of [$W_1$, $W_2$, $W_3$, $W_4$] in Sector 1 is [$P_{High}$, $P_{Low}$, $P_{Low}$, $P_{reuse1}$], the transmission power of [$W_1$, $W_2$, $W_3$, $W_4$] in Sector 2 is [$P_{Low}$, $P_{High}$, $P_{Low}$, $P_{reuse1}$], the transmission power of [$W_1$, $W_2$, $W_3$, $W_4$] in Sector 3 is [$P_{Low}$, $P_{Low}$, $P_{High}$, $P_{reuse1}$], and the condition $P_{High}$>$P_{reuse1}$>$P_{Low}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values corresponding to sub-bands of $L_n$−1 lowest transmission power levels in the sub-band set in which the frequency reuse factor is Reuse n (n≠1), wherein $L_n$ is the number of transmission power levels in the sub-band set in which the frequency reuse factor is Reuse n (n≠1).

The sum a (a=3 in the present embodiment) of the SPI values of the sub-bands in Frequency Partition#1 and the SPI value b (b=1 in the present embodiment) of the sub-band in Frequency Partition#2 are determined and notified to the base station by the upper-layer network element, and then, are transmitted to the terminal by the base station through the corresponding signaling.

Taking Sector 1 as an example, the method for transmitting the interference control signaling and the corresponding receiving method are described in detail.

(1) The base station selects the SPI value corresponding to the sub-band having the lowest transmission power level in Frequency Partition#1 according to the SPI value selecting regulation of sub-bands. In the present embodiment, supposing that the SPI values [$SPI_1$, $SPI_2$, $SPI_3$] of the sub-bands [$W_1$, $W_2$, $W_3$] in Frequency Partition#1 are [1.8, 0.6, 0.6] at this moment, the base station selects [$SPI_2$] or [$SPI_3$], viz. [0.6] to form the interference control signaling, and transmits the interference control signaling by means of broadcast for being received by terminal.

(2) The terminal receives the interference control signaling transmitted by the base station, since the SPI values of sub-bands having the same transmission power level in the sub-band set in which the frequency reuse factor is Reuse n (n≠1) are the same, the terminal recovers the SPI values of [$W_2$, $W_3$] by decoding, viz. [$SPI_2$, $SPI_3$] are [0.6, 0.6], and calculates to obtain the SPI value $SPI_1$ of [$W_1$] according to the sum a (a=3) of the SPI values of each sub-band in Frequency Partition#1 which is obtained beforehand, viz. $SPI_1$=a−$SPI_2$−$SPI_3$=3−0.6−0.6=1.8.

(3) The terminal obtains that $SPI_4$ of the sub-band [$W_4$] is $SPI_4$=1 according to SPI value b=1 of the sub-band in Frequency Partition#2 which is obtained beforehand.

Embodiment 5

The present embodiment is described in detail with FIG. 10 as an example. As shown in FIG. 10, the frequency resources are divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$], the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$] the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$], and the condition $P_{High}$≥$P_{reuse1}$>$P_{Low}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of $k_n$−1 sub-bands which have the highest transmission power in the sub-band sets in which the frequency reuse factor is Reuse n (n≠1), wherein $k_n$ is the number of the sub-bands in the sub-band set in which the frequency reuse factor is Reuse n (n≠1).

The sum a (a=3 in the present embodiment) of the SPI values of each sub-band in Frequency Partition#1, the sum b (b=3 in the present embodiment) of the SPI values of the sub-bands in Frequency Partition#2, and the SPI value c (c=1 in the present embodiment) of the sub-band in Frequency Partition#3 are determined and notified to the base station by the upper-layer network element, and then, are transmitted to the terminal by the base station through the corresponding signaling.

Taking Sector 1 as an example, the method for transmitting the interference control signaling and the corresponding receiving method are described in detail.

(1) The base station selects SPI values of two sub-bands having the highest transmission power in Frequency Partition#1 and selects SPI values of two sub-bands having the highest transmission power in Frequency Partition#2 according to the SPI value selecting regulation of sub-bands, wherein, in Frequency Partition sets of the same kind, if the transmission power of the sub-bands is the same, judgment can be made according to the sizes of the serial numbers of the sub-bands, the smaller the serial numbers of the sub-bands are, the greater the transmission power of the sub-bands is. In the present embodiment, supposing that the SPI values [$SPI_1$, $SPI_2$, $SPI_3$, $SPI_4$, $SPI_5$, $SPI_6$] of the sub-bands [$W_1$, $W_2$, $W_3$, $W_4$, $W_5$, $W_6$] in Frequency Partition#1 and Frequency Partition#2 are [1.8, 0.6, 0.6, 0.6, 1.2, 1.2] at this moment, the base station selects [$SPI_1$, $SPI_2$, $SPI_5$, $SPI_6$], viz. [1.8, 0.6, 1.2, 1.2], and transmits [1.8, 0.6, 1.2, 1.2] through the interference control signaling by means of broadcast for being received by terminal.

(2) The terminal receives the interference control signaling transmitted by the base station, recovers the SPI values [$SPI_1$, $SPI_2$, $SPI_5$, $SPI_6$], viz. [1.8, 0.6, 1.2, 1.2], of [$W_1$, $W_2$, $W_5$, $W_6$] by decoding, and calculates to obtain the SPI values $SPI_3$, $SPI_4$ of [$W_3$, $W_4$] according to the sum a=3 of SPI values of each sub-band in Frequency Partition#1 and the sum b=3 of SPI values of each sub-band in Frequency Partition#2 which are obtained beforehand, viz. $SPI_3$=a−$SPI_1$−$SPI_2$=3−1.8−0.6=0.6; $SPI_4$=b−$SPI_5$−$SPI_6$=3−1.2−1.2=0.6.

(3) The terminal obtains that $SPI_7$ of [$W_7$] is $SPI_7$=1 according to the SPI value c=1 of the sub-band in Frequency Partition#3 which is obtained previously.

Embodiment 6

The present embodiment is described in detail with FIG. 10 as an example. As shown in FIG. 10, the frequency resources are firstly divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$] the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$], the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$], and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values corresponding to sub-bands of $L_n$−1 highest transmission power levels in the sub-band set in which the frequency reuse factor is Reuse n (n≠1), wherein $L_n$ is the number of transmission power levels in the sub-band sets in which the frequency reuse factor is Reuse n (n≠1). The sum a (a=3 in the present embodiment) of the SPI values of the sub-bands in Frequency Partition#1, the sum b (b=3 in the present embodiment) of the SPI values of each sub-band in Frequency Partition#2, and the SPI value c (c=1 in the present embodiment) of the sub-band in Frequency Partition#3 are determined and notified to the base station by the upper-layer network element, and then, are transmitted to the terminal by the base station through the corresponding signaling.

Taking Sector 1 as an example, the method for transmitting the interference control signaling and the corresponding receiving method described in detail.

(1) The base station selects SPI value of one sub-band having the highest transmission power level in Frequency Partition#1 and selects SPI value of one sub-band having the highest transmission power level in Frequency Partition#2 according to the SPI value selecting regulation of sub-bands. In the present embodiment, supposing that the SPI values [$SPI_1$, $SPI_2$, $SPI_3$, $SPI_4$, $SPI_5$, $SPI_6$] of the sub-bands [$W_1$, $W_2$, $W_3$, $W_4$, $W_5$, $W_6$] in Frequency Partition#1 and Frequency Partition#2 are [1.8, 0.6, 0.6, 0.6, 1.2, 1.2] at this moment, the base station selects [$SPI_1$, ($SPI_5$ or $SPI_6$)], viz. [1.8, 1.2], and transmits [1.8, 1.2] through the interference control signaling by the means of broadcast for being received by terminal.

(2) The terminal receives the interference control signaling transmitted by the base station, recovers the SPI values [$SPI_1$, $SPI_5$, $SPI_6$], viz. [1.8, 1.2, 1.2], of [$W_1$, $W_5$, $W_6$] by decoding, and calculates to obtain the SPI values $SPI_2$, $SPI_3$, $SPI_4$ of [$W_2$, $W_3$, $W_4$] according to the sum a=3 of SPI values of each sub-band in Frequency Partition#1 and the sum b=3 of SPI values of each sub-band in Frequency Partition#2 which are obtained beforehand, viz. $SPI_2$=$SPI_3$=(a−$SPI_1$)/2=(3−1.8)/2=0.6 and $SPI_4$=b−$SPI_5$−$SPI_6$=3−1.2−1.2=0.6.

(3) The terminal obtains that $SPI_7$ of [$W_7$] is $SPI_7$=1 according to the SPI value c=1 of the sub-band in Frequency Partition#3 which is obtained previously.

Embodiment 7

The present embodiment is described in detail with FIG. 10 as an example. As shown in FIG. 10, the frequency resources are divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$] the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$] the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$] and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of $Q_n-1$ sub-bands having the smallest serial numbers in the sub-band sets in which the frequency reuse factor is Reuse n (n≠1), wherein $Q_n$ is the number of the sub-bands in the sub-band set in which the frequency reuse factor is Reuse n (n≠1).

The sum a (a=3 in the present embodiment) of the SPI values of each sub-band in Frequency Partition#1, the sum b (b=3 in the present embodiment) of the SPI values of each sub-band in Frequency Partition#2, and the SPI value c (c=1 in the present embodiment) of the sub-band in Frequency Partition#3 are determined and notified to the base station by the upper-layer network element, and then, are transmitted to the terminal by the base station through the corresponding signaling.

Taking Sector 1 as an example, the method for transmitting the interference control signaling and the corresponding receiving method are described in detail.

(1) In the present embodiment, supposing that the SPI values [$SPI_1$, $SPI_2$, $SPI_3$, $SPI_4$, $SPI_5$, $SPI_6$] of the sub-bands [$W_1$, $W_2$, $W_3$, $W_4$, $W_5$, $W_6$] in Frequency Partition#1 and Frequency Partition#2 are [1.8, 0.6, 0.6, 0.6, 1.2, 1.2] at this moment, the base station selects SPI values [$SPI_1$, $SPI_2$, $SPI_4$, $SPI_5$], viz. [1.8, 0.6, 0.6, 1.2], of [$W_1$, $W_2$, $W_4$, $W_5$], and transmits [1.8, 0.6, 0.6, 1.2] through the interference control signaling by means of broadcast for being received by terminal.

(2) The terminal receives the interference control signaling transmitted by the base station, recovers the SPI values [$SPI_1$, $SPI_2$, $SPI_4$, $SPI_5$], viz. [1.8, 0.6, 0.6, 1.2], of [$W_1$, $W_2$, $W_4$, $W_5$] by decoding, and calculates to obtain the SPI values $SPI_3$, $SPI_6$ of [$W_3$, $W_6$] according to the sum a=3 of SPI values of each sub-band in Frequency Partition#1 and the sum b=3 of SPI values of each sub-band in Frequency Partition#2 which are obtained beforehand, viz. $SPI_3$=a−$SPI_1$−$SPI_2$=3−1.8−0.6=0.6 $SPI_6$=b−$SPI_4$−$SPI_5$=3−0.6−1.2=1.2.

(3) The terminal obtains that $SPI_7$ of [$W_7$] is $SPI_7$=1 according to the SPI value c=1 of the sub-band in Frequency Partition#3 which is obtained previously.

Embodiment 8

The present embodiment is described in detail with FIG. 7 as an example. As shown in FIG. 7, firstly, the frequency resources are divided into two frequency sets, viz. Frequency Partition#1 (Reuse 3) and Frequency Partition#2 (Reuse 1), wherein [$W_1$, $W_2$, $W_3$] belongs to Frequency Partition#1, and [$W_4$] belongs to Frequency Partition#2. The transmission power of [$W_1$, $W_2$, $W_3$, $W_4$] in Sector 1 is [$P_{High}$, $P_{Low}$, $P_{Low}$, $P_{reuse1}$], the transmission power of [$W_1$, $W_2$, $W_3$, $W_4$] in Sector 2 is [$P_{Low}$, $P_{High}$, $P_{Low}$, $P_{reuse1}$], the transmission power of [$W_1$, $W_2$, $W_3$, $W_4$] in Sector 3 is [$P_{Low}$, $P_{Low}$, $P_{High}$, $P_{reuse1}$] and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through the corresponding signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of $Q_n-1$ sub-bands having the smallest serial numbers in the sub-band set in which the frequency reuse factor is Reuse n (n≠1), wherein $Q_n$ is the number of the sub-bands in the sub-band set in which the frequency reuse factor is Reuse n (n≠1).

The sum a (a=3 in the present embodiment) of the SPI values of each sub-band in Frequency Partition#1, and the SPI value b (b=1 in the present embodiment) of the sub-band in Frequency Partition#2 are determined and notified to the base station by the upper-layer network element, and then, are transmitted to the terminal by the base station through the corresponding signaling.

Taking Sector 1 as an example, the method for transmitting the interference control signaling and the corresponding receiving method are described in detail.

(1) In the present embodiment, supposing that the SPI values [$SPI_1$, $SPI_2$, $SPI_3$] of the sub-bands [$W_1$, $W_2$, $W_3$] in Frequency Partition#1 are [1.8, 0.6, 0.6] at this moment, the base station selects SPI values [$SPI_1$, $SPI_2$], viz. [1.8, 0.6], of [$W_1$, $W_2$], and transmits [1.8, 0.6] through the interference control signaling by means of broadcast for being received by terminal.

(2) The terminal receives the interference control signaling transmitted by the base station, recovers the SPI values of [$W_1$, $W_2$], viz. [$SPI_1$, $SPI_2$] are [1.8, 0.6], by decoding, and calculates to obtain the SPI value $SPI_3$ of [$W_3$] according to the sum a=3 of SPI values of each sub-band in Frequency Partition#1 which is obtained beforehand, viz. $SPI_3$=a−$SPI_1$−$SPI_2$=3−1.8−0.6=0.6.

(3) The terminal obtains that $SPI_4$ of [$W_4$] is $SPI_4$=1 according to the SPI value b=1 of the sub-band in Frequency Partition#2 which is obtained previously.

Embodiment 9

The present embodiment is described in detail taking FIG. 4 as an example. As shown in FIG. 4, the frequency resources are divided into two frequency sets, viz. Frequency Partition#1 (Reuse 3) and Frequency Partition#2 (Reuse 1), wherein [$W_1$, $W_2$, $W_3$] belongs to Frequency Partition#1, and $W_4$ belongs to Frequency Partition#2. The transmission power of [$W_1$, $W_2$, $W_3$, $W_4$] in Sector 1 is [$P_{High}$, $P_{Low1}$, $P_{Low2}$, $P_{reuse1}$] the transmission power of [$W_1$, $W_2$, $W_3$, $W_4$] in Sector 2 is [$P_{Low2}$, $P_{High}$, $P_{Low1}$, $P_{reuse1}$] the transmission power of [$W_1$, $W_2$, $W_3$, $W_4$] in Sector 3 is [$P_{Low1}$, $P_{Low2}$, $P_{High}$, $P_{reuse1}$] and the condition $P_{High} > P_{reuse1} > P_{Low1} > P_{Low2}$ is satisfied. The above basic configuration information is notified to the corresponding base station by the upper-layer network element through air interface and/or Backbone (Backhaul), and then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1) and SPI values of $k_n-1$ sub-bands having the lowest transmission power in the sub-band set in which the frequency reuse factor is Reuse n (n≠1), wherein $k_n$ is the number of the sub-bands in the sub-band set in which the frequency reuse factor is Reuse n (n≠1).

The sum a (a=3 in the present embodiment) of the SPI values of each sub-band in Frequency Partition#1 is determined and notified to the base station by the upper-layer network element, and then, is transmitted to the terminal by the base station through relevant signaling.

Taking Sector 1 as an example, the method for transmitting the interference control signaling and the corresponding receiving method are described in detail.

(1) The base station selects SPI values of two sub-bands, viz. [$W_2$, $W_3$], having the lowest transmission power in Frequency Partition#1 and SPI value of [$W_4$] in Frequency Partition#2 according to the SPI value selecting regulation of sub-bands. In the present embodiment, supposing that the SPI values [$SPI_1$, $SPI_2$, $SPI_3$, $SPI_4$] of the sub-bands [$W_1$, $W_2$, $W_3$, $W_4$] in Frequency Partition#1 and Frequency Partition#2 are [1.8, 0.7, 0.5, 1] at this moment, the base station selects [$SPI_2$, $SPI_3$, $SPI_4$], viz. [0.7, 0.5, 1], and transmits [0.7, 0.5, 1] to the terminal through the interference control signaling by means of broadcast.

(2) The terminal receives the interference control signaling transmitted by the base station, recovers the SPI values [$SPI_2$, $SPI_3$, $SPI_4$], viz. [0.7, 0.5, 1], of [$W_2$, $W_3$, $W_4$] by decoding, and calculates to obtain the SPI value $SPI_1$ of [$W_1$] according to the sum a (a=3) of SPI values of each sub-band in Frequency Partition#1 which are obtained beforehand, viz. $SPI_1 = a - SPI_2 - SPI_3 = 3 - 0.7 - 0.5 = 1.8$.

Embodiment 10

The present embodiment is described in detail taking FIG. 7 as an example. As shown in FIG. 7, firstly, the frequency resources are divided into two frequency sets, viz. Frequency Partition#1 (Reuse 3) and Frequency Partition#2 (Reuse 1), wherein [$W_1$, $W_2$, $W_3$] belongs to Frequency Partition#1, $W_4$ belongs to Frequency Partition#2. The transmission power of [$W_1$, $W_2$, $W_3$, $W_4$] in Sector 1 is [$P_{High}$, $P_{Low}$, $P_{Low}$, $P_{reuse1}$], the transmission power of [$W_1$, $W_2$, $W_3$, $W_4$] in Sector 2 is [$P_{Low}$, $P_{High}$, $P_{Low}$, $P_{reuse1}$], the transmission power of [$W_1$, $W_2$, $W_3$, $W_4$] in Sector 3 is [$P_{Low}$, $P_{Low}$, $P_{High}$, $P_{reuse1}$] and the condition $P_{High} > P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1), and selecting SPI values corresponding to sub-bands of $L_n-1$ lowest transmission power levels in the sub-band set in which the frequency reuse factor is Reuse n (n≠1), wherein $L_n$ is the number of the transmission power levels in the sub-band set in which the frequency reuse factor is Reuse n (n≠1).

The sum a (a=3 in the present embodiment) of the SPI values of each sub-band in Frequency Partition#1 is determined and notified to the base station by the upper-layer network element, and then, is transmitted to the terminal by the base station through relevant signaling.

Taking Sector 1 as an example, the method for transmitting the interference control signaling and the corresponding receiving method are described in detail.

(1) The base station selects SPI value corresponding to a sub-band having the lowest transmission power level in Frequency Partition#1 and SPI values of the sub-bands in Frequency Partition#2 according to the SPI value selecting regulation of sub-bands. In the present embodiment, supposing that the SPI values [$SPI_1$, $SPI_2$, $SPI_3$, $SPI_4$] of the sub-bands [$W_1$, $W_2$, $W_3$, $W_4$] in Frequency Partition#1 and Frequency Partition#2 are [1.8, 0.6, 0.6, 1] at this moment, the base station selects [$SPI_2$ or $SPI_3$, $SPI_4$], viz. [0.6, 1] to form the interference control signaling, and transmits the interference control signaling to the terminal by means of broadcast.

(2) The terminal receives the interference control signaling transmitted by the base station, since the SPI values of sub-bands having the same transmission power level in the sub-band set in which the frequency reuse factor is Reuse n (n≠1) are the same, the terminal recovers the SPI values of [$W_2$, $W_3$, $W_4$] by decoding, viz. [$SPI_2$, $SPI_3$, $SPI_4$] are [0.6, 0.6, 1], and calculates to obtain the SPI value $SPI_1$ of [$W_1$] according to the sum a (a=3) of the SPI values of each sub-band in Frequency Partition#1 which is obtained beforehand, viz. $SPI_1 = a - SPI_2 - SPI_3 = 3 - 0.6 - 0.6 = 1.8$.

Embodiment 11

The present embodiment is described in detail taking FIG. 10 as an example. As shown in FIG. 10, the frequency resources are divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$], the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$], the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$], and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1) and selecting SPI values of $k_n-1$ sub-bands having the highest transmission power in the sub-band set in which the frequency reuse factor is Reuse n (n≠1), wherein $k_n$ is the number of the sub-bands in the sub-band set in which the frequency reuse factor is Reuse n (n≠1).

The sum a (a=3 in the present embodiment) of the SPI values of each sub-bands in Frequency Partition#1, and the sum b (b=3 in the present embodiment) of the SPI values of each sub-band in Frequency Partition#2 are determined and notified to the base station by the upper-layer network element, and then, are transmitted to the terminal by the base station through relevant signaling.

Taking Sector 1 as an example, the method for transmitting the interference control signaling and the corresponding receiving method are described in detail.

(1) The base station selects SPI values of two sub-bands having the highest transmission power in Frequency Partition#1, selects SPI values of two sub-bands having the highest transmission power in Frequency Partition#2, and selects SPI values of the sub-bands in Frequency Partition#3 according to the SPI value selecting regulation of sub-bands, wherein, in Frequency Partition sets of the same kind, if the transmission power of the sub-bands is the same, judgment can be made according to the sizes of the serial numbers of the sub-bands, specifically, the smaller the serial numbers of the sub-bands are, the greater the transmission power is. In the present embodiment, supposing that the SPI values [$SPI_1$, $SPI_2$, $SPI_3$, $SPI_4$, $SPI_5$, $SPI_6$, $SPI_7$] of the sub-bands [$W_1$, $W_2$, $W_3$, $W_4$, $W_5$, $W_6$, $W_7$] in Frequency Partition#1, Frequency Partition#2 and Frequency Partition#3 are [1.8, 0.6, 0.6, 0.6, 1.2, 1.2, 1] at this moment, the base station selects [$SPI_1$, $SPI_2$, $SPI_5$, $SPI_6$, $SPI_7$], viz. [1.8, 0.6, 1.2, 1.2, 1], and transmits [1.8, 0.6, 1.2, 1.2, 1] to the terminal through the interference control signaling by means of broadcast.

(2) The terminal receives the interference control signaling transmitted by the base station, recovers the SPI values [$SPI_1$, $SPI_2$, $SPI_5$, $SPI_6$, $SPI_7$], viz. [1.8, 0.6, 1.2, 1.2, 1], of [$W_1$, $W_2$, $W_5$, $W_6$, $W_7$] by decoding, and calculates to obtain the SPI values $SPI_3$, $SPI_4$ of [$W_3$, $W_4$] according to the sum a=3 of SPI values of each sub-band in Frequency Partition#1 and the sum b=3 of SPI values of each sub-band in Frequency Partition#2 which are obtained beforehand, viz. $SPI_3$=a−$SPI_1$−$SPI_2$=3−1.8−0.6=0.6, $SPI_4$=b−$SPI_5$−$SPI_6$=3−1.2−1.2=0.6.

Embodiment 12

The present embodiment is described in detail taking FIG. 10 as an example. As shown in FIG. 10, firstly the frequency resources are divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$], the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$], the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$], and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1) and selecting SPI values corresponding to sub-bands of $L_n-1$ highest transmission power levels in the sub-band set in which the frequency reuse factor is Reuse n (n≠1), wherein $L_n$ is the number of the transmission power levels in the sub-band set in which the frequency reuse factor is Reuse n (n≠1).

The sum a (a=3 in the present embodiment) of the SPI values of each sub-band in Frequency Partition#1 and the sum b (b=3 in the present embodiment) of the SPI values of each sub-band in Frequency Partition#2 are determined and notified to the base station by the upper-layer network element, and then, are transmitted to the terminal by the base station through relevant signaling.

Taking Sector 1 as an example, the method for transmitting the interference control signaling and the corresponding receiving method are described in detail.

(1) The base station selects SPI value of a sub-band having the highest transmission power level in Frequency Partition#1, selects SPI value of a sub-band having the highest transmission power level in Frequency Partition#2, and selects SPI values of the sub-bands in Frequency Partition#3 according to the SPI value selecting regulation of sub-bands. In the present embodiment, supposing that the SPI values [$SPI_1$, $SPI_2$, $SPI_3$, $SPI_4$, $SPI_5$, $SPI_6$, $SPI_7$] of the sub-bands [$W_1$, $W_2$, $W_3$, $W_4$, $W_5$, $W_6$,] in Frequency Partition#1, Frequency Partition#2, and Frequency Partition#3 are [1.8, 0.6, 0.6, 0.6, 1.2, 1.2, 1] at this moment, the base station selects [$SPI_1$, ($SPI_5$ or $SPI_6$), $SPI_7$], viz. [1.8, 1.2, 1], and transmits [1.8, 1.2, 1] to the terminal through the interference control signaling by means of broadcast.

(2) The terminal receives the interference control signaling transmitted by the base station, recovers the SPI values [$SPI_1$, $SPI_5$, $SPI_6$, $SPI_7$], viz. [1.8, 1.2, 1.2, 1], of [$W_1$, $W_5$, $W_6$, $W_7$] by decoding, and calculates to obtain the SPI values $SPI_2$, $SPI_3$, $SPI_4$ of [$W_2$, $W_3$, $W_4$] according to the sum a=3 of SPI values of each sub-band in Frequency Partition#1 and the sum b=3 of SPI values of each sub-band in Frequency Partition#2 which are obtained beforehand, viz. $SPI_2$=$SPI_3$=(a−$SPI_1$)/2=(3−1.8)/2=0.6, $SPI_4$=b−$SPI_5$−$SPI_6$=3−1.2−1.2=0.6.

Embodiment 13

The present embodiment is described in detail taking FIG. 10 as an example. As shown in FIG. 10, firstly the frequency resources are divided into three frequency sets, viz. Frequency Partition#1 (Reuse 3), Frequency Partition#2 (Reuse 3/2) and Frequency Partition#3 (Reuse 1), wherein [$W_1$, $W_2$, $W_3$] belongs to Frequency Partition#1, [$W_4$, $W_5$, $W_6$] belongs to Frequency Partition#2, [$W_7$] belongs to Frequency Partition#3. The transmission power of [$W_1$, $W_2$, $W_3$, $W_4$, $W_5$, $W_6$, $W_7$] in Sector 1 is [$P_{High}$, $P_{Low}$, $P_{Low}$, $P_{Low}$, $P_{High}$, $P_{High}$, $P_{reuse1}$] the transmission power of [$W_1$, $W_2$, $W_3$, $W_4$, $W_5$, $W_6$, $W_7$] in Sector 2 is [$P_{Low}$, $P_{High}$, $P_{Low}$, $P_{High}$, $P_{High}$, $P_{Low}$, $P_{reuse1}$], the transmission power of [$W_1$, $W_2$, $W_3$, $W_4$, $W_5$, $W_6$, $W_7$] in Sector 3 is [$P_{Low}$, $P_{Low}$, $P_{High}$, $P_{High}$, $P_{Low}$, $P_{High}$, $P_{reuse1}$], and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1) and selecting SPI values of $Q_n-1$ sub-bands having the smallest serial numbers in the sub-band sets in which the frequency reuse factor is Reuse n (n≠1), wherein $Q_n$ is the number of the sub-bands in the sub-band set in which the frequency reuse factor is Reuse n (n≠1).

The sum a (a=3 in the present embodiment) of the SPI values of each sub-bands in Frequency Partition#1, and the sum b (b=3 in the present embodiment) of the SPI values of each sub-band in Frequency Partition#2 are determined and notified to the base station by the upper-layer network element, and then, are transmitted to the terminal by the base station through relevant signaling.

Taking Sector 1 as an example, the method for transmitting the interference control signaling and the corresponding receiving method are described in detail.

(1) In the present embodiment, supposing that the SPI values [$SPI_1$, $SPI_2$, $SPI_3$, $SPI_4$, $SPI_5$, $SPI_6$, $SPI_7$] of the sub-bands [$W_1$, $W_2$, $W_3$, $W_4$, $W_5$, $W_6$, $W_7$] in Frequency Partition#1, Frequency Partition#2 and Frequency Partition#3 are [1.8, 0.6, 0.6, 0.6, 1.2, 1.2, 1] at this moment, the base station selects SPI values [$SPI_1$, $SPI_2$, $SPI_4$, $SPI_5$, $SPI_7$], viz. [1.8, 0.6, 0.6, 1.2, 1], of [$W_1$, $W_2$, $W_4$, $W_5$, $W_7$], and transmits [1.8, 0.6, 0.6, 1.2, 1] to the terminal through the interference control signaling by means of broadcast.

(2) The terminal receives the interference control signaling transmitted by the base station, recovers the SPI values [$SPI_1$, $SPI_2$, $SPI_4$, $SPI_5$, $SPI_7$], viz. [1.8, 0.6, 0.6, 1.2, 1], of [$W_1$, $W_2$, $W_4$, $W_5$, $W_7$] by decoding, and calculates to obtain the SPI values $SPI_3$, $SPI_6$ of [$W_3$, $W_6$] according to the sum a=3 of SPI values of each sub-band in Frequency Partition#1 and the sum b=3 of SPI values of each sub-band in Frequency Partition#2 which are obtained beforehand, viz. $SPI_3=a-SPI_1-SPI_2=3-1.8-0.6=0.6$, $SPI_6=b-SPI_4-SPI_5=3-0.6-1.2=1.2$.

Embodiment 14

The present embodiment is described in detail taking FIG. 7 as an example. As shown in FIG. 7, firstly, the frequency resources are divided into two frequency sets, viz. Frequency Partition#1 (Reuse 3) and Frequency Partition#2 (Reuse 1), wherein [$W_1$, $W_2$, $W_3$] belongs to Frequency Partition#1, [$W_4$] belongs to Frequency Partition#2. The transmission power of [$W_1$, $W_2$, $W_3$, $W_4$] in Sector 1 is [$P_{High}$, $P_{Low}$, $P_{Low}$, $P_{reuse1}$], the transmission power of [$W_1$, $W_2$, $W_3$, $W_4$] in Sector 2 is [$P_{Low}$, $P_{High}$, $P_{Low}$, $P_{reuse1}$], the transmission power of [$W_1$, $W_2$, $W_3$, $W_4$] in Sector 3 is [$P_{Low}$, $P_{Low}$, $P_{High}$, $P_{reuse1}$], and the condition $P_{High} \geq P_{reuse1} > P_{Low}$ is satisfied. The above basic configuration information is notified to the corresponding base station by the upper-layer network element through air interface and/or Backbone (Backhaul), then the base station transmits the above basic configuration information to the terminal through relevant signaling.

The upper-layer network element notifies the SPI value selecting regulation of sub-bands to the corresponding base station through air interface and/or Backbone (Backhaul), and then the base station transmits the SPI value selecting regulation of sub-bands to the terminal through relevant signaling; or the base station selects the SPI value selecting regulation of sub-bands and transmits the SPI value selecting regulation of sub-bands to the terminal through relevant signaling. The SPI value selecting regulation of sub-bands in the present embodiment is: selecting SPI values of sub-bands having the frequency reuse factor of Reuse n (n=1) and selecting SPI values of $Q_n-1$ sub-bands having the smallest serial numbers in the sub-band set in which the frequency reuse factor is Reuse n (n≠1), wherein $Q_n$ is the number of the sub-bands in the sub-band set in which the frequency reuse factor is Reuse n (n≠1).

The sum a (a=3 in the present embodiment) of the SPI values of the sub-bands in Frequency Partition#1 is determined and notified to the base station by the upper-layer network element, and then, is transmitted to the terminal by the base station through the corresponding signaling.

Taking Sector 1 as an example, the method for transmitting the interference control signaling and the corresponding receiving method described in detail.

(1) In the present embodiment, supposing that the SPI values [$SPI_1$, $SPI_2$, $SPI_3$, $SPI_4$] of the sub-bands [$W_1$, $W_2$, $W_3$, $W_4$] in Frequency Partition#1 and Frequency Partition#2 are [1.8, 0.6, 0.6, 1] at this moment, the base station selects SPI values [$SPI_1$, $SPI_2$, $SPI_4$], viz. [1.8, 0.6, 1], of [$W_1$, $W_2$, $W_4$], and transmits [1.8, 0.6, 1] to the terminal through the interference control signaling by means of broadcast.

(2) The terminal receives the interference control signaling transmitted by the base station, recovers the SPI values [$SPI_1$, $SPI_2$, $SPI_4$], viz. [1.8, 0.6, 1], of [$W_1$, $W_2$, $W_4$] by decoding, and calculates to obtain the SPI value $SPI_3$ of [$W_3$] according to the sum a=3 of SPI values of each sub-band in Frequency Partition#1 which is obtained beforehand, viz. $SPI_3=a-SPI_1-SPI_2=3-1.8-0.6=0.6$.

According to the embodiments of the present invention, a computer-readable medium is also provided. Computer executable instructions are stored on the computer-readable medium, when the instructions are executed by a computer or processor, the computer or processor is made to carry out processes in the steps as shown in FIG. 2 and FIG. 3. Preferably, one or more of the above method embodiments can be carried out.

The method for transmitting and receiving interference control signaling in the wireless communication system provided by the embodiments of the present invention can effectively save the system overhead, and facilitate the terminal's analyzing SPI value of each sub-band.

In addition, the implementation of the present invention requires no modification of the system architecture and the existing processing flow. The present invention is easy to implement, and convenient to promote in the technical field, and has strong industrial applicability.

Obviously, those skilled in the art shall appreciate, all of the above modules or steps of the present invention can be realized by a universal computing device, they can be concentrated in a single computing device, or distributed in the network consisting of several computing devices, preferably, they can be realized by program codes executable by the computing device, such that they can be stored in a storage device to be executed by the computing device, or each of them can be manufactured into an integrated circuit module, or several modules or steps of them can be manufactured into a single integrated circuit module. In this way, the present invention is not limited to the combination of any particular hardware and software.

The descriptions above are only preferable embodiments of the present invention, which are not used to restrict the present invention. For those skilled in the art, the present invention may have various changes and variations. Any amendments, equivalent substitutions, improvements and etc. within the spirit and principle of the present invention are all concluded in the scope of the claims of the present invention.

What is claimed is:

1. A method for transmitting interference control signaling in a wireless communication system, comprising: selecting by a base station Sub-band Price Indication (SPI) values of a part of sub-bands in a sub-band set in which frequency reuse factor is Reuse=n>1 according to SPI value selecting regulation of sub-bands, forming interference control signaling, and transmitting the interference control signaling to terminals of the base station through a downlink channel;
wherein the SPI values of a part of sub-bands refer to SPI values of $k_n-1$ sub-bands in a sub-band set in which the frequency reuse factor is Reuse=n>1, wherein $k_n$ is the number of the sub-bands in the sub-band set in which the frequency reuse factor is Reuse=n>1; or
the SPI values of a part of sub-bands refer to SPI values of sub-bands corresponding to $L_n-1$ transmission power levels in a sub-band set in which the frequency reuse factor is Reuse=n>1, wherein $L_n$ is the number of transmission power levels in the sub-band set in which the frequency reuse factor is Reuse=n>1,
wherein the SPI value selecting regulation of sub-bands is that the base station selects SPI values of $k_n-1$ sub-bands from the sub-band set in which the frequency reuse factor is Reuse=n>1 through the transmission power of the sub-bands or the serial numbers of the sub-bands according to configuration information; or
the SPI value selecting regulation of sub-bands is that the base station selects SPI values of sub-bands of $L_n-1$ transmission power levels from the sub-band set in which the frequency reuse factor is Reuse=n>1 through the transmission power of the sub-bands or the serial numbers of the sub-bands according to configuration information; and
wherein the configuration information comprises transmission power of the sub-bands in a sub-band set in which the frequency reuse factor is Reuse=n≥1, the SPI values of sub-bands in a sub-band set in which Reuse n=1 and the sum of the SPI values of all the sub-bands in the sub-band set in which Reuse=n>1.

2. The method for transmitting interference control signaling according to claim 1, wherein the $k_n-1$ sub-bands are the $k_n-1$ sub-bands having the highest transmission power, the $k_n-1$ sub-bands having the lowest transmission power, the $k_n-1$ sub-bands having specified transmission power, or the $k_n-1$ sub-bands determined according to serial numbers of the sub-bands in the sub-band set in which the frequency reuse factor is Reuse=n>1.

3. The method for transmitting interference control signaling according to claim 1, wherein the interference control signaling comprises Index and related SPI values; wherein the Index comprises Connect Identity, and the SPI values comprise SPI values of sub-bands that need to be transmitted, with the SPI values of sub-bands described by means of absolute value or relative value.

4. The method for transmitting interference control signaling according to claim 3, wherein the manner for the base station transmitting the interference control signaling to the terminal comprises: unicast, multicast or broadcast.

5. A method for receiving interference control signaling transmitted according to the method of claim 1, comprising a terminal:
receiving interference control signaling transmitted by a base station;
obtaining SPI values of $k_n-1$ sub-bands in a sub-band set in which the frequency reuse factor is Reuse=n>1 through decoding the interference control signaling according to SPI value selecting regulation of sub-bands, wherein $k_n$ is the number of the sub-bands in the sub-band set in which frequency reuse factor is Reuse=n>1;
obtaining sum of SPI values of all the sub-bands in the sub-band set in which the frequency reuse factor is Reuse=n>1 according to the SPI value selecting regulation of sub-bands, and thereby, calculating to obtain SPI value of the $k_n$ th sub-band in the sub-band set in which the frequency reuse factor is Reuse=n>1;
determining corresponding relation between each SPI value and the sub-band according to the SPI value selecting regulation of sub-bands; and
obtaining SPI values of sub-bands in a sub-band set in which the frequency reuse factor is Reuse=1 according to the SPI value selecting regulation of sub-bands, and thereby, recovering SPI value of each sub-band in a sub-band set in which the frequency reuse factor is Reuse=n≥1.

6. A method for receiving interference control signaling transmitted according to the method of claim 1, comprising a terminal:
receiving interference control signaling transmitted by a base station;
obtaining SPI values corresponding to sub-bands of $L_n-1$ transmission power levels in a sub-band set in which frequency reuse factor is Reuse=n>1 through decoding the interference control signaling according to SPI value selecting regulation of sub-bands, wherein $L_n$ is the number of transmission power levels in the sub-band set in which the frequency reuse factor is Reuse=n>1;
obtaining sum of the SPI values of all the sub-bands in the sub-band set in which the frequency reuse factor is Reuse=n>1 according to the SPI value selecting regulation of sub-bands, and thereby, calculating to obtain SPI value corresponding to sub-band of the $L_n$ th power level in the sub-band set in which the frequency reuse factor is Reuse=n>1;
determining the corresponding relation between each SPI value and the sub-band according to the SPI value selecting regulation of sub-bands; and
obtaining SPI values of sub-bands in a sub-band set in which the frequency reuse factor is Reuse=1 according to the SPI value selecting regulation of sub-bands, and thereby, recovering SPI value of each sub-band in a sub-band set in which the frequency reuse factor is Reuse=n≥1.

7. The method for transmitting interference control signaling according to claim 1, wherein the sub-bands of $L_n-1$ transmission power levels are the sub-bands corresponding to the highest transmission power levels, or the sub-bands corresponding to the lowest transmission power levels, or the sub-bands of specified transmission power levels in the sub-band set in which the frequency reuse factor is Reuse=n>1.

8. A method for transmitting interference control signaling in wireless communication system, comprising transmitting by a base station information of SPI values of a part of sub-bands to a terminal through a downlink channel;

wherein the part of sub-bands is the part of sub-bands in a sub-band set in which the frequency reuse factor is Reuse n (n≠1) and/or the part of sub-bands in a sub-band set in which the frequency reuse factor is Reuse n (n=1);

wherein the SPI values of the part of sub-bands comprise at least one of the following:

SPI values of $k_n-1$ sub-bands in a sub-band set in which the frequency reuse factor is Reuse n (n≠1), wherein $k_n$ is the number of sub-bands in the sub-band set in which the frequency reuse factor is Reuse n (n≠1);

SPI values corresponding to sub-bands of $L_n-1$ transmission power levels in the sub-band set in which the frequency reuse factor is Reuse n (n≠1), wherein $L_n$ is the number of transmission power levels in the sub-band set in which the frequency reuse factor is Reuse n (n≠1); and SPI values of a part of sub-bands in a sub-band set in which the frequency reuse factor is Reuse n (n=1), wherein if the SPI values of the part of sub-bands are SPI values of $k_n-1$ sub-bands in the sub-band set in which the frequency reuse factor is Reuse n (n≠1), the information of the SPI values of the part of sub-bands is determined by at least one of the following manners:

determining by the base station according to SPI value selecting regulation of sub-bands;

determining by an upper-layer network element according to the SPI value selecting regulation of sub-bands; and determining by the base station according to the SPI values selecting regulation of sub-bands which is determined by the upper-layer network element;

wherein the SPI value selecting regulation of sub-bands is configured to select SPI values of $k_n-1$ sub-bands in the sub-band set in which the base station frequency reuse factor is Reuse n (n≠1) according to transmission power of the sub-bands and/or serial numbers of the sub-bands and/or information related to the sub-bands; and the SPI value selecting regulation of sub-bands is performed in at least one of the following manners: selecting SPI values of $k_n-1$ sub-bands having the highest transmission power, selecting SPI values of $k_n-1$ sub-bands having the lowest transmission power, and selecting SPI values of pre-determined $k_n-1$ sub-bands, and wherein if the SPI values of the part of sub-bands are the SPI values corresponding to sub-bands of $L_n-1$ transmission power levels in the sub-band set in which the frequency reuse factor is Reuse n (n≠1), and the information of the SPI values of the part of sub-bands is determined by at least one of the following manners:

determining by the base station according to SPI value selecting regulation of sub-bands;

determining by an upper-layer network element according to the SPI value selecting regulation of sub-bands; and determining by the base station according to the SPI value selecting regulation, of sub-bands which is determined by the upper-layer network element;

wherein the SPI value selecting regulation of sub-bands is configured to select SPI values corresponding to sub-bands of $L_n-1$ transmission power levels in the sub-band set in which the base station frequency reuse factor is Reuse n (n≠1) according to the transmission power of the sub-bands; and the SPI value selecting regulation of sub-bands is performed in at least one of the following manners: selecting SPI values of sub-bands of $L_n-1$ transmission power levels having the highest transmission power level, selecting SPI values of $L_n-1$ sub-bands of $L_n-1$ transmission power levels having the lowest transmission power, and selecting SPI values corresponding to pre-determined sub-bands of $L_n-1$ transmission power levels.

9. The method according to claim 8, wherein the base station transmits the information of the SPI values of the part of sub-bands to the terminal by at least one of the following manners: unicast; multicast; and broadcast.

10. A method for receiving interference control signaling in wireless communication system, comprising receiving interference control signaling by a terminal, and determining SPI values of sub-bands;

wherein the method for determining SPI values of sub-bands comprises:

recovering an algorithm of SPI values of the remaining sub-bands from the information of the SPI values of the part of sub-bands which have been obtained by decoding;

wherein the operation of recovering an algorithm of SPI values of the remaining sub-bands from the information of the SPI values of the part of sub-bands which have been obtained by decoding comprises:

the terminal recovering the algorithm of SPI values of the other sub-bands according to the known sum of the SPI values of the sub-bands in the sub-band set in which the frequency reuse factor is Reuse n (n≠1) and the SPI values of $k_n-1$ sub-bands in the sub-band set in which the frequency reuse factor is Reuse n (n≠1) obtained by decoding the interference control signaling; or the terminal recovering SPI values of the other sub-bands according to the known sum of the SPI values of the sub-bands in the sub-band set in which the frequency reuse factor is Reuse n (n≠1) and the SPI values of sub-bands of $L_n-1$ power levels in the sub-band set in which the frequency reuse factor is Reuse n (n≠1) obtained by decoding the interference control signaling, and further obtaining the algorithm of SPI value of each sub-band in the sub-band set in which the frequency reuse factor is Reuse n (n≠1), wherein the SPI values of sub-bands having the same transmission power level in the sub-band set in which the frequency reuse factor is Reuse n (n≠1) are the same; or the terminal obtains SPI values of sub-bands in a sub-band set in which the frequency reuse factor is Reuse n (n=1) by decoding the interference control signaling.

11. The method according to claim 10, comprising: obtaining by the terminal the sum of SPI values of sub-bands in the sub-band set in which the frequency reuse factor is Reuse n (n≠1) through at least one of the following manners:

storing the sum of SPI values of sub-bands in the sub-band set in which the frequency reuse factor is Reuse n (n≠1) as default configuration at the terminal;

transmitting, by the base station, the sum of SPI values of sub-bands in the sub-band set in which the frequency reuse factor is Reuse n (n≠1) to the terminal through relevant signaling; and transmitting, by the upper-lay network element, the sum of SPI values of sub-bands in the sub-band set in which the frequency reuse factor is Reuse n (n≠1) to the base station side when the terminal is initially accessed to the system, and then transmitting, by the base station, the same to the terminal through relevant signaling.

* * * * *